(12) United States Patent
Ahmed et al.

(10) Patent No.: US 9,483,811 B2
(45) Date of Patent: Nov. 1, 2016

(54) DIVISION OF PROCESSING BETWEEN SYSTEMS BASED ON EXTERNAL FACTORS

(71) Applicant: Microsoft Technology Licensing, LLC, Redmond, WA (US)

(72) Inventors: Haroon Ahmed, Bellevue, WA (US); David Paul Hill, Redmond, WA (US); Robert M. Bruckner, Redmond, WA (US); Patrick McKay, Redmond, WA (US); David G. Campbell, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/148,421

(22) Filed: Jan. 6, 2014

(65) Prior Publication Data

US 2015/0193901 A1    Jul. 9, 2015

(51) Int. Cl.
*G06T 1/20*    (2006.01)
*G06F 9/50*    (2006.01)

(52) U.S. Cl.
CPC ............... *G06T 1/20* (2013.01); *G06F 9/5027* (2013.01); *G06F 2209/509* (2013.01)

(58) Field of Classification Search
CPC ....... G06T 1/20; G06F 9/5044; G06F 9/505; G06F 2209/501
USPC ................. 345/502, 505, 506, 718
See application file for complete search history.

(56) References Cited

U.S. PATENT DOCUMENTS

| | | |
|---|---|---|
| 6,684,257 B1 | 1/2004 | Camut et al. |
| 7,072,984 B1 | 7/2006 | Polonsky et al. |
| 7,274,368 B1 | 9/2007 | Keslin |
| 7,672,863 B2 | 3/2010 | Kurosawa et al. |
| 7,809,663 B1 * | 10/2010 | Birch .................. G06N 99/005 706/14 |
| 8,200,610 B1 * | 6/2012 | Birch .................. G06N 99/005 706/12 |
| 8,266,653 B2 | 9/2012 | Emura et al. |

(Continued)

FOREIGN PATENT DOCUMENTS

EP    1469391    10/2004

OTHER PUBLICATIONS

Sun, et al., "Seamless Switching of Scalable Video Bit Streams for Efficient Streaming" In IEEE Transactions on Multimedia, vol. 6, Issue 2, Apr. 2004, 13 pages.

(Continued)

*Primary Examiner* — Gregory J Tryder
*Assistant Examiner* — Michael Le
(74) *Attorney, Agent, or Firm* — Kate Drakos; Doug Barker; Micky Minhas (57) ABSTRACT

A method includes acts for rendering, on a data processing system, a result derived from a set of data by performing data processing across a first data processing system and a second data processing system. The amount of processing performed by the second data processing system can be dynamically adjusted depending on factors affecting the second data processing system. The first data processing system receives information defining how the result will be rendered at the second data processing system. The first data processing system receives information indicating factors affecting the second data processing system. The first data processing system dynamically allocates the needed data processing between the first data processing system and the second data processing system, based on factors affecting the second data processing system.

25 Claims, 5 Drawing Sheets

(56) References Cited

U.S. PATENT DOCUMENTS

| | | | |
|---|---|---|---|
| 8,396,983 | B1 | 3/2013 | Inskip et al. |
| 8,495,218 | B1* | 7/2013 | Shao .................... G06F 9/5022 709/223 |
| 8,595,186 | B1 | 11/2013 | Mandyam et al. |
| 2002/0163918 | A1* | 11/2002 | Cline .......................... 370/399 |
| 2002/0174316 | A1 | 11/2002 | Dale et al. |
| 2002/0174613 | A1 | 11/2002 | Katz |
| 2004/0183462 | A1 | 9/2004 | Frank et al. |
| 2007/0271569 | A1 | 11/2007 | Ohlgren et al. |
| 2008/0175188 | A1 | 7/2008 | Kozisek |
| 2008/0301545 | A1 | 12/2008 | Zhang et al. |
| 2008/0307048 | A1 | 12/2008 | Friedler et al. |
| 2009/0125474 | A1 | 5/2009 | Kim et al. |
| 2009/0199080 | A1 | 8/2009 | Fox et al. |
| 2009/0288013 | A1 | 11/2009 | Zhang et al. |
| 2010/0131624 | A1 | 5/2010 | Ferris |
| 2010/0186019 | A1 | 7/2010 | Branson et al. |
| 2010/0229180 | A1 | 9/2010 | Masuda |
| 2010/0262971 | A1 | 10/2010 | Yamada |
| 2011/0010455 | A1* | 1/2011 | Wolfe ....................... G06F 9/00 709/226 |
| 2011/0054880 | A1 | 3/2011 | Fleizach |
| 2011/0106946 | A1 | 5/2011 | Bao et al. |
| 2011/0283287 | A1 | 11/2011 | Ha |
| 2012/0197596 | A1 | 8/2012 | Comi |
| 2012/0233555 | A1 | 9/2012 | Psistakis et al. |
| 2012/0262477 | A1 | 10/2012 | Buchheit |
| 2012/0284663 | A1* | 11/2012 | Driver ................... G06F 3/0485 715/784 |
| 2012/0331088 | A1 | 12/2012 | O'Hare et al. |
| 2013/0086265 | A1 | 4/2013 | Bao et al. |
| 2013/0093787 | A1 | 4/2013 | Fulks et al. |
| 2013/0198319 | A1 | 8/2013 | Shen et al. |
| 2013/0268674 | A1 | 10/2013 | Bailey et al. |
| 2013/0332943 | A1 | 12/2013 | Sun et al. |
| 2014/0010282 | A1 | 1/2014 | He et al. |
| 2014/0047011 | A1 | 2/2014 | Lahav et al. |
| 2014/0125686 | A1 | 5/2014 | Volotinen et al. |
| 2014/0282085 | A1 | 9/2014 | Hsu et al. |
| 2014/0372782 | A1 | 12/2014 | Breternitz et al. |
| 2015/0193275 | A1 | 7/2015 | Ahmed et al. |
| 2015/0193902 | A1 | 7/2015 | Ahmed et al. |
| 2015/0195153 | A1 | 7/2015 | Ahmed et al. |

OTHER PUBLICATIONS

"Using Multi-bitrate Streaming", Retrieved on: Nov. 8, 2013, 6 pages, Available at: http://support.brightcove.com/en/video-cloud/docs/using-multi-bitrate-streaming.
Office Action dated Aug. 7, 2015 cited in U.S. Appl. No. 14/148,502.
"Second Written Opinion Issued in PCT Application No. PCT/US2014/072012", Mailed Date: Dec. 15, 2015, 7 Pages.
"Second Written Opinion Issued in PCT Application No. PCT/US2014/072010", Mailed Date: Jan. 4, 2016, 10 Pages.
Office Action dated Jan. 4, 2016 cited in U.S. Appl. No. 14/148,517.
Office Action dated Feb. 26, 2016 cited in U.S. Appl. No. 14/148,502.
"Second Written Opinion Issued in PCT Application No. PCT/US2014/072011", Mailed Date: Jan. 4, 2016, 11 Pages.
Office Action dated Feb. 26, 2016 cited in U.S. Appl. No. 14/148,370.
"International Preliminary Report on Patentability Issued in PCT Application No. PCT/US2014/072012", Mailed Date: Mar. 9, 2016, 8 Pages.
"International Preliminary Report on Patentability Issued in PCT Application No. PCT/US2014/072010", Mailed Date: Apr. 13, 2016, 11 Pages.
U.S. Appl. No. 61/767,535, filed Feb. 21, 2013, Bourke.
Cuervo, et al., "MAUI: Making Smartphones Last Longer with Code Offload", Proceedings of the 8th International Conference on Mobile Systems, Applications, and Services, MOBISYS '10, Jan. 2010, p. 49.
Giurgiu, et al., "Calling the Cloud: Enabling Mobile Phones as Interfaces to Cloud Applications", Nov. 2009, Middleware 2009, Springer Berling Heidelberg, Berlin, Heidelberg, pp. 83-102.
Shiraz, et al., "Investigation on runtime partitioning of elastic mobile applications for mobile cloud computing", The Journal of Supercomputing, vol. 67, No. 1, Jan. 2014, pp. 84-103.
Kumar, et al., "Cloud Computing for Mobile users: Can Offloading Computation Save Energy?", Computer, IEEE, US, vol. 42, No. 4, Apr. 2010, pp. 51-56.
"International Search Report and Written Opinion Issued in PCT Patent Application No. PCT/US2014/072010", Mailed Date: Mar. 31, 2015, 19 pages.
"International Search Report & Written Opinion Received for PCT Patent Application No. PCT/US2014/072011", Mailed Date: Apr. 7, 2015, 16 pages.
Lu, et al., "Virtualized Screen: A Third Element for Cloud-Mobile Convergence", In proceedings of IEEE Multimedia, vol. 18, Issue 2, Feb. 2011, 8 pages.
Abolfazli, et al., "Cloud-Based Augmentation for Mobile Devices: Motivation, Taxonomies, and Open Challenges", In Proceedings of IEEE Communications Surveys & Tutorials, vol. 16, Issue 1, Jul. 19, 2013, 32 pages.
U.S. Appl. No. 14/148,517, filed Jul. 30, 2015, Office Action.
"International Search Report and Written Opinion Issued in PCT Patent Application No. PCT/US2014/072012", Mailed Date: Mar. 4, 2015, 10 Pages.
International Preliminary Report on Patentability Issued In PCT Application No. PCT/US2014/072011, Mailed Date: Apr. 18, 2016, 12 Pages.
Notice of Allowance dated Jul. 29, 2016 cited in U.S. Appl. No. 14/148,502.

* cited by examiner

DIVISION OF PROCESSING BETWEEN SYSTEMS BASED ON EXTERNAL FACTORS

BACKGROUND

Background and Relevant Art

Computers and computing systems have affected nearly every aspect of modern living. Computers are generally involved in work, recreation, healthcare, transportation, entertainment, household management, etc.

Currently, there a large numbers of varying-capability devices and services running applications. Local devices, such as desktops, laptops, phones, media players, embedded systems, and the like store and process relatively small scale local data due to hard limits in processing power and local storage. In contrast data centers, such as cloud scale systems can store and process relatively large amounts of data due to their virtually limitless processing and storage capabilities. Building one stack of software that provides immersive user experience across this diverse set of devices and systems is increasingly challenging. To manage the cost of building software to such a diverse range, typical solutions tend to limit support to smaller number of environments and/or compromise user experience by investing in less flexible general purpose technologies. While both small scale local devices and large scale distributed systems can be used together to provide a user experience at the local devices, the majority of the data processing tends to be performed at the distributed systems, while display functionality tends to be performed by the local system, with little variability in the amount of processing performed by the different systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment including a first data processing system and a second data processing system. The method includes acts for rendering, on the second data processing system, a result derived from a set of data by performing data processing across the first data processing system and the second data processing system. The amount of processing performed by the second data processing system can be dynamically adjusted depending on factors affecting the second data processing system. The method includes the first data processing system receiving information defining how the result will be rendered at the second data processing system. The first data processing system receives information indicating factors affecting the second data processing system. The first data processing system dynamically allocates the needed data processing between the first data processing system and the second data processing system, based on factors affecting the second data processing system, wherein the needed data processing consists of a first portion to be performed by the first data system and a second portion to be performed by the second data processing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5 illustrates a method for dividing data processing across two systems and rendering data at one of the systems based on platform versus brand shine-through.

DETAILED DESCRIPTION

Embodiments illustrated herein allow data processing to be dynamically allocated among different systems. This can be accomplished, in some embodiments, by varying the amount of data sent as less-processed data intended to be further processed versus the amount of more fully preprocessed data that is sent. In the most extreme example, one system could process all data to create a set of pixels or bitmaps for display by a second system. The first system could then stream the pixels or bitmaps to the second system, where the second system would simply render the pixels or bitmaps by displaying them on a display at the second system. Alternative methods could be implemented to provide the pixels or bitmaps, such as email or other messaging. At the other extreme, all raw data could be sent from the first system to the second system, where the second system would store, process and render the data.

While there currently exist systems which perform similar functionality, in contrast, embodiments herein include functionality for dynamically varying the amount of processing performed on the less-processed data at the first system, and allowing the second system to perform processing on portions of the less-processed data to produce processed data that can be rendered at the second system. Using the preceding example, the second system will receive some pre-processed data, but will also process some additional less-processed data to create data that can be rendered by displaying all of the processed data at the second system. The amount of pre-processed data compared with the amount of less-processed data sent to the second system may vary over time based on changing factors. Thus, embodiments can dynamically change the amount of data processing performed by each of the two systems.

The amount of processing done at the first system and the amount of processing done at the second system is dynamically dependent on capabilities of the second system. Thus, for example, if the first system determines that the second system has low processing capabilities or low data storage capabilities, the first system can process most or all of the less-processed data such that the data sent from the first device to the second device is all or mostly pixels or otherwise preprocessed. In contrast, if the first system can determine, for example, that the second system has relatively high processing capabilities and relatively high storage capabilities, and there are no other limiting factors, then the first system can send mostly less-processed data which will be later processed by the second system to create renderable data at the second system that can then be rendered by displaying the data at the second system.

The amount of pre-processed data versus the amount of less-processed data sent by the first system to the second system could be varied dynamically based on capabilities of the second system including when capabilities of the second system change. Thus, if the second system is operating in a low power state, or if the second system is busy processing other tasks such that available processing power and/or storage is low, then more pre-processed data and less less-processed data would be sent by the first system to the second system than when the second system is in a full power mode and/or is not busy processing other tasks locally. Various other capabilities are illustrated below as well, such as interface capabilities, storage capabilities, available hardware devices, whether a system is being powered on battery power or some hard-wired power source, amount of battery power remaining, etc.

In some embodiments, external factors affecting a system can also be used to determine processing allocation between systems. For example, network bandwidth, network latencies, fault domains, business considerations, administrator settings, degree of system integration, etc. can be used to determine how processing is allocated between systems.

Figure 1:
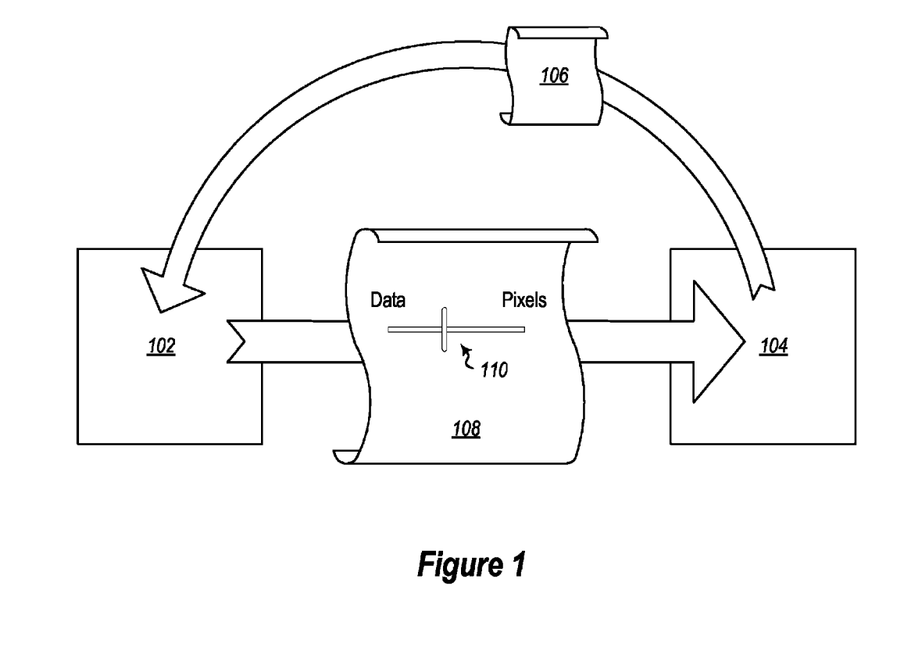
FIG. 1 illustrates first and second data processing systems that may interact with each other.

An illustrative example is illustrated in FIG. 1. FIG. 1 illustrates a first system 102, which may be for example a server, distributed service, cloud service, etc. FIG. 1 also illustrates a second system 104, which may be for example a client system, such as a desktop system, a laptop system, a smart phone, or other client system. Note that while the server client example is illustrated and called out, in other embodiments, the first and second system may be peers in a peer to peer system, implemented on the same computer hardware, or other configurations could be implemented.

As illustrated in FIG. 1, the second system 104 sends the first system 102 information 106 indicating the capabilities of the second system 104. As will be discussed in more detail below, the capabilities may include information such as available processing power, available memory, available persistent storage, available hardware devices, available software applications installed, available managed runtime environments or development platforms, available human user interfaces, etc. The first system 102 sends a set 108 of data to the second system 104. FIG. 1 illustrates the set 108 of data represented with a slider control 110 that ranges between pure raw data and pure pixels. This metaphorically represents the fact that the set 108 of data can be variably configured by the first system 102 to be only raw data such that all processing and rendering is performed by the second system 104 or that the set 108 of data can be only pixels such that virtually no additional processing of the data in the set 108 of data is performed other than to render the data in the set 108 of data by displaying it at the second system 104 or that the set 108 of data can be some variable amount of less-processed data and pixel data depending on the capabilities of the second system 104.

Often applications attempt to be highly interactive and highly data driven. However, when all or most of the data processing is being performed at a first system 102 (e.g. a server), while rendering is performed at a second system 104 (e.g. a client), these goals can be difficult to achieve. Illustratively, user interaction would require the first system 102 to send pixels to the second system 104, the second system 104 to receive interaction with a user, the second system 104 to send the interactions to the first system 102, the first system 102 to perform more data processing, the first system 102 to create pixels, the first system 102 to send the pixels to the second system 104, and finally for the second system 104 to display the pixels. However, if the second system 104 has low processing power, equal or worse interactivity experiences may be exhibited if the second system 104 must spend inordinate amounts of time performing the processing which could be done much quicker by the first system 102.

Consider the following examples. Assume that a trivial application performs a mathematical addition operation on three variables A, B and C. Variables A and B may be static or obtained by some calculation. C is a user provided variable. In scenarios where a client device (e.g. system 104) is a low capability device, and so indicates to a server (e.g. system 102), the client will receive input from a user, send the input to the server will perform the operation A+B+C. If the client is a medium capability device, the server can calculate A+B and send the result to the client, where the client would receive the input for C and then simply add C to the previously provided result from the server for A+B. If the client is a high capability device, the server could simply provide A and B to the client. The client could then receive C from a user and calculate A+B+C at the client.

In an alternative embodiment, division of processing could be based on implementation cost which inherently depends upon underlying platform capabilities. In this case, the allocation of processing is determined at the initialization of a session (connection time) and does not change afterwards. For example speech-to-text conversion, or optical character recognition or touch gesture recognitions are all expansive algorithms that are only supported by mature development platforms and usually not available on emerging devices. Thus, a determined amount of processing could be determined at session initialization and would not change after that unless there was extensive and unlikely changes made to the second system such that the allocation of processing would likely not change after the initial allocation.

Allocation of processing could occur at various different points. For example, the allocation could be determined at one or more of the following points moving in order from least dynamic to most dynamic: development time, compile time, installation time, session initialization, on capability changes, with every request, and/or a continuous calibration. These points are likely the most common points where processing allocation is made, but it should be appreciated that other points can be used to determine that a change in processing allocation should be made between the first and second systems.

Scenarios could be implemented based on type of operations, percentage of operations, etc. For example, different operations could be classified differently depending on how much processing power an operation requires to perform. For example, logical XOR operations are relatively simple while floating point calculations are relatively complex. Between these two operations are varying complexities of operations. A complexity value could be identified or defined for the operations. For example, a static complexity value may be manually assigned to an operation. In the example above, perhaps a complexity of 1 could be applied to an XOR operation and a complexity of 10 applied to a floating point calculation. A simple addition calculation might be assigned a 4. Alternatively, a number of processor cycles to accomplish an operation may be determined. The types of operations passed to the client device would be based on the capabilities of the client device. For example, highly capable devices could be directed to perform all operations, while as a client's capabilities decreased, the device would only be directed to perform operations not exceeding some complexity threshold, processor cycle threshold, or other appropriate measure.

In an alternative embodiment, a device may be directed to perform a percentage of operations based on its capabilities. The more capable a device is, the higher percentage of the total operations performed by an application the device would be directed to perform. In another alternative or additional embodiment, a device could be directed to perform operations at a particular rate depending on its capabilities. For example, the more capable a device is, the more operations per minute, second, or some other unit of time the device will be directed to perform. Any other operations that need to be performed, but that cannot be performed at the rate that the device is performing operations could then be performed at a different system (e.g. the first system 102, when the device is the second system 104).

Similar principles could be implemented for graphical operations. For example, operations may range from displaying pixels to performing complex polygon calculations, with varying complexity operations (such as scaling, coloring, shading, layout recalculation (e.g. moving between portrait and landscape), zooming, panning, scrolling, antialiasing, etc.) in between. Each of these could have some complexity value associated with them and a threshold could be determined such that, depending on the capabilities of a client device (e.g. system 104), operations within the threshold could be sent to the client while operations exceeding the threshold could be performed by a server or service (e.g. system 102) to produce pixels which could be sent to the client for display. Thus, for example, if a device is a low capability device, embodiments could cause the server to convert data to geometry and also render the geometry to bitmap images and simply send those bitmaps images to the device with no need for any local computation. Interactivity would be achieved by techniques like use of image maps and/or by tunneling user inputs to a service. This does not necessarily cause a lower quality experience, given a sufficiently capable network connection between the two systems.

Figure 2:
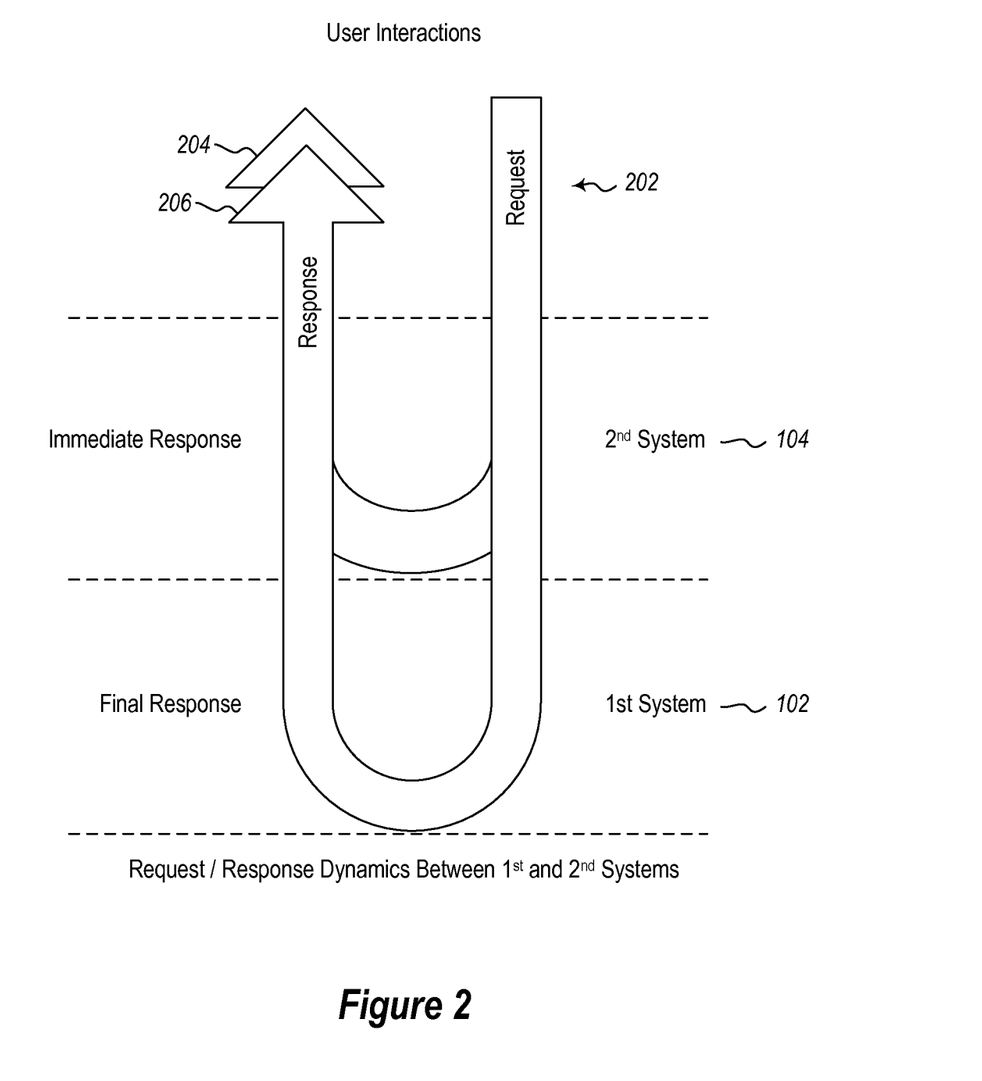
FIG. 2 illustrates a graphical representation of perceived responsiveness by a user.

In an alternative example, if the device is a moderately capable device (in this example, the device is not capable of doing data-to-geometry conversion and layout operations locally), then during resize drag operations, embodiments could perform layout on the server and do optical scaling on the client device to manage immediate responsiveness while waiting on the server. An example of this is illustrated in FIG. 2, which illustrates a graphical representation of perceived responsiveness by a user. FIG. 2 illustrates that a user issues a request 202 to the second system 104. Insofar as the second system can perform processing on the second system 104, it does so and returns a response 206 to the user. This provides a sense of immediate response to the user. However, additional processing may be performed by the first system 102 and once a response 204 can be sent from the first system, the response 204 is sent. This also contributes to the responsiveness sensed by the user.

Various other decisions could be made as to which operations to perform at the server and which operations to perform at the device based on the capabilities of the device or other factors affecting the device. Percentage of total operations performed at the device and rate of operations requested of a device could be used as measures of operations, as in the previous examples illustrated herein. Also, as noted, the amount and/or type of operations could change over time for the same device based on changing device capabilities. Further, it should be noted that a similar user experience could be presented, even though there are changes in which system performs which operations. For example, a particular level of service could be selected, such as a service level that displays 200×200 pixels. Even though the client device's abilities to provide a portion of the pixels may change, 200×200 pixels will nonetheless be provided over time as a result of the efforts of the server system (e.g. system 102) and the client system (e.g. system 104) even though each system performs different amounts of the data processing over time.

Other classes of operations could use similar principles. For example, ink recognition or speech-to-text conversion could happen on the client if the software support is available. Otherwise the raw input will be streamed to the server for processing. In another example, predictive analytics or forecasting algorithms can shift processing depending upon the size of data and other machine learning factors. In yet another example, processing allocation between different machines may be dynamically allocated based on dynamic models, such as dynamic learning models. For example, consider an ink to text conversion. When a user first acquires the second data processing system, embodiments could bias the ink to text conversion to take place more often on the first data processing system. As the first data processing system learns the inking behavior of the user, resulting in a model of the user's gestures created on first data processing system, this model could be installed on the second data processing system to make the ink to text conversion more accurate without having to leverage the first data processing system as much over time.

In yet another example, processing may be allocated among different machines based on the nature of the user interaction itself. This is largely independent of the complexity of actual operations. For example, real-time interactions (which require the system to provide UI updates in real-time based on user input) will be done on the client (e.g. second data processing system 104). In contrast, non real-time interactions (even very simple ones) need not be, and may be done on the server (e.g., the first data processing system) for other operational reasons.

Embodiments herein can facilitate providing highly interactive and highly data driven applications by balancing what processing is performed by each system based on the capabilities of one or both of the systems and the quality of communication channels between them. For example, as illustrated above, embodiments have the ability to send instructions from a service (e.g. a master) to client (e.g. a slave) (or between peers) anywhere on the spectrum of pure data and pure pixels based on individual feature requirements.

Using such functionality, embodiments may provide the flexibility to run all or subset of a pipeline of components across service and client tiers. Thus, embodiments exhibit the robustness to dynamically decide service/client handshaking details for individual features based on factors like client hardware and software capabilities, performance of communication medium between systems, historical usage patterns, availability of the system, load characteristics, business constraints, etc.

Business constraints, in cloud based service contexts, may be related to subscription types, resources purchased, remaining resources, competitive landscape, etc. For example, subscription types may refer to, in some embodiments, a service level that a user has subscribed to. The service levels can have different guarantees of amount and type of resources, guarantees of service and/or resource availability, etc. Generally lower levels of resources purchased by a user or lower service levels purchased by a user suggest that more processing will be performed by a client machine rather than at a cloud based service as larger amounts of resources may not be available at the cloud service to a particular user based on the user not having subscribed to those services. Alternatively, if a user has a given allocation of resources in term of time or amount of processing, as a user nears the limit of that allocation, more processing may be offloaded to client devices rather than cloud devices.

Some embodiments may be implemented in conjunction with the Power View visualization platform available from Microsoft Corporation of Redmond Wash. The Power View visualization platform provides the visual foundation for all Power BI (Business Intelligence) clients, also available from Microsoft Corporation of Redmond Wash. The architectural style for this particular system is "Backend Heavy—Native Frontends", meaning that a backend can perform the major portions of data processing, while data is presented to a user using native frontend user interface technologies. This allows the following concepts to be implemented:

Ubiquity and variety of deployment configurations (e.g. across single or two tiers);

Support for all data sizes—from local offline data to cloud scale large data;

Build once, run everywhere for visuals and behaviors allowing a developer to write a single set of application code that can be run at a server while allowing clients to use their native interfaces to interact with the application;

Maximize performance for different client devices across a large spectrum of client devices, e.g. from phones to PCs;

Instant access to all device capabilities, whether standard or proprietary;

Choice of user experience allowing a varying levels of platform shine-through where client native user interface elements are provided or brand shine-through where standardized user interface elements are provided for all users;

Innovation at continuous cadence from visuals to analytics to allow updates to an application for all users and without needing the users to manually apply the updates, but rather updating at the server level;

Flexibility to engineer visuals, whether built by a system implementer or bought from a third party;

Richer collaboration prospects across multiple users of the same session;

Unconstrained access to open source software innovations—across web and devices.

Power BI, and other services, offer highly data driven, visually interconnected experiences on a variety of single-tier and two tier deployment modes across devices and services. Scenarios could range from interactive visuals insights, to predictive analytics, to scheduled reports over the spectrum of local to cloud scale data.

A two tier system may implement a data-centric visual representation model, and code which runs the representation model. The two tier system has a server or service (e.g. system 102), such as a cloud based service, that typically runs much of the code while the representation model is displayed at a client device (e.g. system 104) connected to the server or service. In a one tier system, different entities can be implemented in an offline mode. For example, different virtual systems can be implemented on the same hardware, such that communications do not need to take place over a wide area network or in a cloud environment for the two entities to communicate with each other. Thus, in some embodiments, both the first data processing system and the second data processing system can be implemented on a single client device. A scheduled job is another example of a single tier system where first and second systems run on server hardware and deliver results, such as via email or by adding to server storage at scheduled times. Embodiments herein may be implemented in one tier or two tier systems, or similar configurations and combinations.

Typical representation models range from 'pure-raw data' to 'pure-pixels'. At one end of a spectrum where the service performs minimal processing, the service serves less-processed data. At the other end of the spectrum, the service performs maximal processing such that the service renders output to bitmaps which are sent to the client. User inputs are forwarded to the service and handled by the service. Previous solutions predominantly chose either end of the spectrum at an application level. In contrast, embodiments herein provide flexibility to choose at feature level granularity and ongoing dynamic negotiation.

Thus, embodiments implement a visual representation model that is fully flexible. The visual representation model can support a full range of values allowing developers to design service/client workloads appropriately for their scenarios. Doing more or less on the first system or second system may therefore be about managing and balancing, for example, one or more of the following trade-off factors:

Cloud size Data vs. Client size Data
Low Interactivity vs. High Interactivity
Cloud Cadence vs. Client Cadence
Single Implementation vs. Multiple Implementations
High Collaboration vs. Low Collaboration
Cloud Capabilities vs. Client Capabilities
Brand Shine-through vs. Platform Shine-through
Connected Experience vs. Offline Experience In particular, embodiments can vary the amount of less-processed data delivered to a client (e.g. system 104). A client with relatively lower storage and/or memory capabilities will have less less-processed data and more pixels or processed data sent to it by a service (e.g. system 102) than a client with relatively higher storage and/or memory capabilities. When less less-processed data is sent to the client, then more less-processed data is processed by the so called "cloud" or other service or server (e.g. system 102), thus balancing the cloud (or server) size data vs. client size data factor.

Embodiments may vary what data is processed at a client based on factors related to whether the client expects a relatively low amount of interactivity with a user or a relatively high amount of interactivity with a user. For example, if a client device has low interactivity capabilities as compared to other devices, more less-processed data can be processed at the backend (e.g. system 102) because there is less need to have a highly interactive user experience at the client device. Low interactivity capabilities may be characterized by smaller screen sizes; less capable or non-existent touch screens; lower screen resolutions; few or no buttons or other peripheral devices; etc. In contrast, devices with higher interactivity capabilities may process more less-processed data at the device while less data is processed at the backend. Higher interactivity devices may be characterized by larger screens; higher screen resolutions; more interactive touchscreens, such as screens having more touch points, more precision, being more responsive, etc.; more input options, such as more buttons, cameras, gps devices, near field sensors, compasses, gyroscopes or other movement sensors, connected peripherals (such as mice, keyboards, pen tablets, biometric sensors, etc.); voice recognition hardware and/or software; a highly interactive native device platform, such as Windows Phone OS available from Microsoft Corporation of Redmond, Wash., iOS available from Apple Corporation of Cupertino, Calif., or Android available from Google Corporation of Mountain View, Calif.; etc. Devices that can be identified as having higher interactivity capabilities may be tasked with performing more operations on less-processed data or receiving less-processed data for an application than a device having lower interactivity capabilities would be tasked with performing for the same application.

Embodiments may balance cadence based on device capabilities. Cadence refers to the ability to update an application. If cadence is performed solely at the service level (e.g. in the "cloud"), the application can be updated without needing to update any client device software. In contrast, cadence can be achieved by updating only software at the client device level. Mixtures of the two can also be implemented. In some embodiments, this may be based on device capabilities of the client device. For example, if a client device has higher processing and/or storage capabilities, an application may be updated at the device level (e.g. system 104 level). Alternatively, for low capability devices (e.g. system 102), applications may be updated at the service level (e.g. at system 104 level). Various alternatives may be implemented. For example, in some embodiments, the client could run a thin client, where some updating could be performed at the client, and also at service level portions of an application, where updating is performed at the service level. The "thinness" of the client could be based on processor and/or storage capabilities. Alternatively or additionally, the "thinness" of the client may be based on what native frameworks (e.g. C#, JavaScript, CSS, HTML5, iOS, etc.) are available at the device. More capable and/or feature rich native frameworks allows a client to be "thinner" meaning that the thin client has less data processing functionality. Thus, the amount of updating at a client would be based on how "thick" or "thin" the client is.

Similarly, Embodiments can balance data processing based on single implementation scenarios vs. multiple implementation scenarios. For example, if a single implementation is to be achieved, much of the processing on less-processed data could be performed at the service level (e.g. system 102 level) such that, for the most part, pixels and bitmaps are sent to the client (e.g. system 104). On the other hand, if there are multiple implementations, such as implementations using native capabilities of Windows Phone OS, IPhone, and Android a thin client (perhaps using C++) could be installed at the device which would act as an interface with the service. More feature rich clients could be implemented at the client device (perhaps using C#, Objective C, and JavaScript respectively).

Embodiments can balance data processing based on the amount of collaboration occurring for an application. For example, in a high collaboration scenario where many users are working on a document or set of data simultaneously, higher processing may be performed at the service level (e.g. system 102 level), which acts as a master for a number of different clients (e.g. systems such as system 104). In a low collaboration scenario where a fewer or potentially even just a single user is working on a document or set of data, more processing can be performed by a client device (e.g. system 104) itself.

As noted, embodiments may balance data processing based on differences in cloud capabilities versus client capabilities. As discussed herein, client capabilities may encompass one or more of a number of different factors. More capable clients may be tasked performing more less-processed data processing than less capable clients would be tasked with when implementing the same application. The less capable clients may be sent less less-processed data and more pixel data or pre-processed data. In contrast, so called cloud implementations have virtually unlimited compute and storage that is available in an elastic manner (on demand). Advanced techniques like machine learning increasingly require cloud capabilities to enrich features with user customizations, social factors, recommendation engines etc. Thus, insofar as a client device cannot handle data processing, cloud implementations can handle whatever processing needs to be handled.

Embodiments may balance processing based on a desire to emphasize either brand "shine-through" or platform 'shine-through." Shine-through is a term used herein to refer to the interactivity experience an end user has. Certain platforms have certain standardized interface elements. For example, users of Windows Phone OS phones, iPhones, and Android phones each expect certain user interface elements to be present in a particular platform and expect a certain "look and feel" when interacting with a particular platform. For example, the IPhone implements a back navigation button in the top left corner of the interface, while Windows Phone OS and Android implement a general back button that can be used for navigation. As another example, iOS uses a true/false slider button while Windows Phone OS and Android use check boxes to achieve the same functionality. If more brand shine-through is desired, then more specific instructions are sent from the service to the client device to provide a more uniform user interface experience. If more platform shine-through is desired, then a general information indicating interface elements can be sent to a client device from a service and the client device can use native platform functionality. For example, a service can send an indication that a check-box should be implemented at the client device. The client device could then implement its native interface element for a check box. For example, if the client device is a Windows Phone OS device, a checkbox would be displayed. In contrast, if the client device is an IPhone, then a true/false slider would be implemented.

Notably, embodiments can vary the amount of brand vs. platform shine-through based on various factors. For example, user preference settings or administrator settings may allow for defining an amount of platform user interface elements should be implemented as compared the amount of branded or consistent user interface elements are displayed at a client device. Some setting may allow various interfaces to be more brand centric, while other interface elements are more platform centric. Brand centric interfaces may cause more processing at the backend system (e.g. system 102) and less processing at the client system (e.g. system 104) as brand user interface elements will be determined by the backend system. In contrast more platform centric interfaces may cause more processing to be performed at the client system while less processing is performed at the backend system.

Put simply, complete brand shine-through requires same look and feel on all platforms. Therefore it is efficient to implement it once on the service instead of multiple implementations at various clients targeting same results. The amount of processing is therefore affected at the clients. As an example for understanding brand shine-through might be illustrated by an application that causes Windows Modern UI Style interfaces on any platform on which it is implemented (e.g. iOS, Android, etc.).

The amount of processing performed by different connected entities may be varied based on hardware implementation details of the different entities with respect to each other. For example, in connected experience scenarios, the entities are connected via external network connections or other external hardware connections. In an offline experience, the entities may be implemented using common hardware. For example, two different entities (e.g. systems 102 and 104) may be implemented on the same machine and use software interconnections for communications. Hybrid examples may also be implemented. For example, the two entities may be implemented mostly on the same hardware system, but may each use different external storage or other external data stores. The more offline two entities are, the more they can share data processing workloads, or alternatively, there may be less concern about which entity performs data processing workloads. In contrast, as the entities become more "connected" with respect to each other, in that they are connected by external network or external hardware connections, there is more consideration given as to which entity performs which data processing work. Additionally, data processing allocations can change as systems become more or less connected with each other. For example, if both systems move to the same storage, this may cause a change in how data processing is allocated between the two different systems.

Returning once again to a general discussion, in general, highly interactive workloads (e.g. rendering, animation, styling, and input-handling) are more suitable on client devices; and data intensive workloads (e.g. data shaping, document analysis, construction of geometry from data, and layout of geometry on canvas) are more suitable on a backend. However, these are general guidelines that work for many features but are generally not requirements from an architecture perspective. Indeed, embodiments herein have the ability to dynamically vary which types of workloads and how much of a given type of workload is performed at clients and which types of workloads and how much of a given type of workload is performed at backends. Thus for example, a map visual can exercise the flexibility of an architecture and send latitude and longitude points to be geocoded and rendered on the client. In another example, a visual with animation frames can do all processing locally and simply stream pixel frames from a service to a client.

Figure 3:
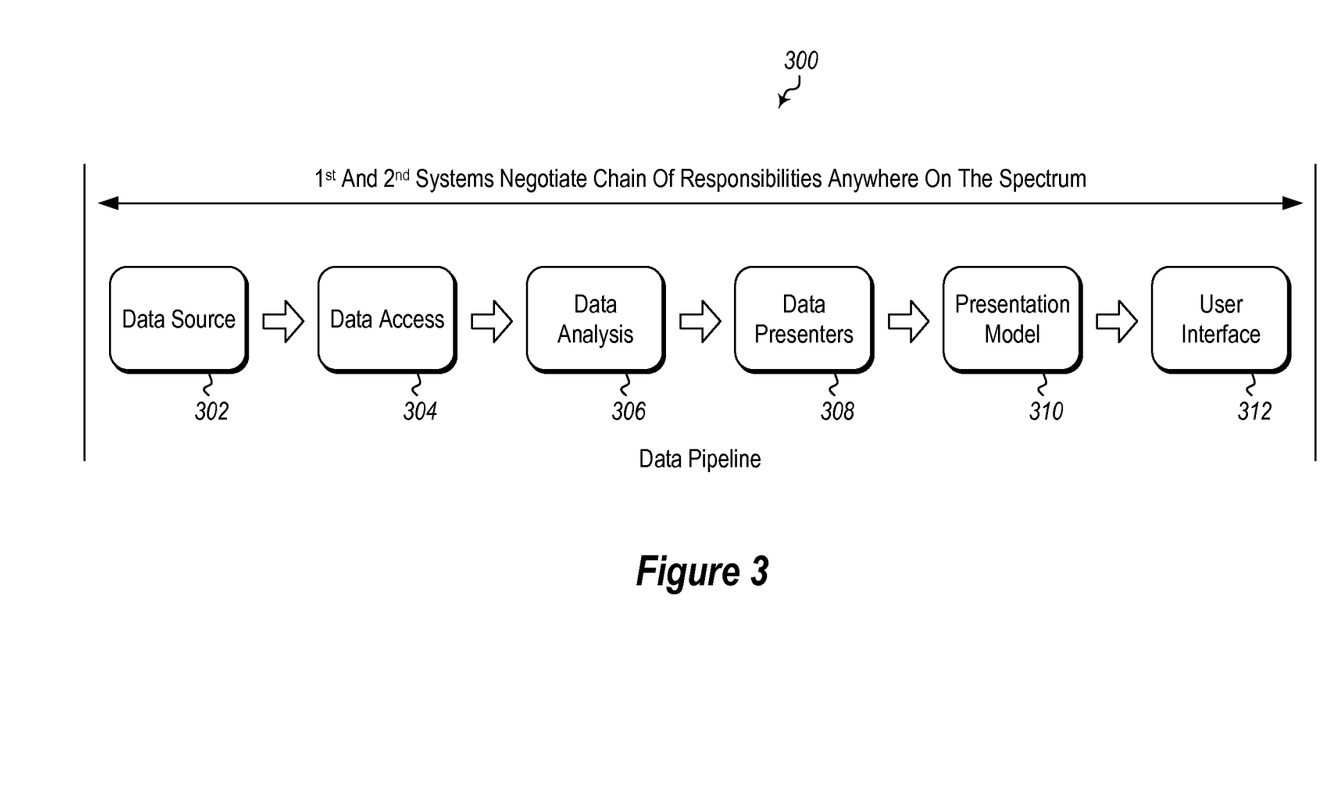
FIG. 3 illustrates a data processing pipeline.

A typical high level pipeline 300 is illustrated in FIG. 3. The pipeline 300 illustrates a spectrum along which negotiation of processing responsibilities can be negotiated. In particular, FIG. 3 illustrates a data source block 302 representing generation of data. FIG. 3 illustrates a data access block 304 where already generated data can be accessed. FIG. 3 illustrates a data analysis block 306 where computations can be performed on data or data can be otherwise analyzed. FIG. 3 illustrates a data presenter block 308 representing mechanisms for presenting data. FIG. 3 illustrates a presentation model block 310 illustrating that models can be developed regarding how data will be presented. Finally, FIG. 3 illustrates a user interface block 312 representing elements that can be used by a user to view and/or interact with representations of data or the results of analyzing data.

In some embodiments, processing may be divided at a particular point along the spectrum illustrated in the pipeline 300. For example, some embodiments may determine that processing represented by blocks 302-306 should occur on the first data processing system 102 and that processing represented by blocks 308-312 should occur on the second data processing system 104. As another extreme example, for a low capability device, embodiments may determine that processing represented by blocks 302-310 should be performed at the first data processing system 102 while the second data processing system simply displays a user interface as illustrated by the block 312.

In alternative embodiments, the two different data processing systems 102 and 104 may share different portions of different processing represented by the blocks of FIG. 3. For example, the first data processing system 102 may produce some data as represented by the data source block 302, but other portions of the data may be produced by the second data processing system 104.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
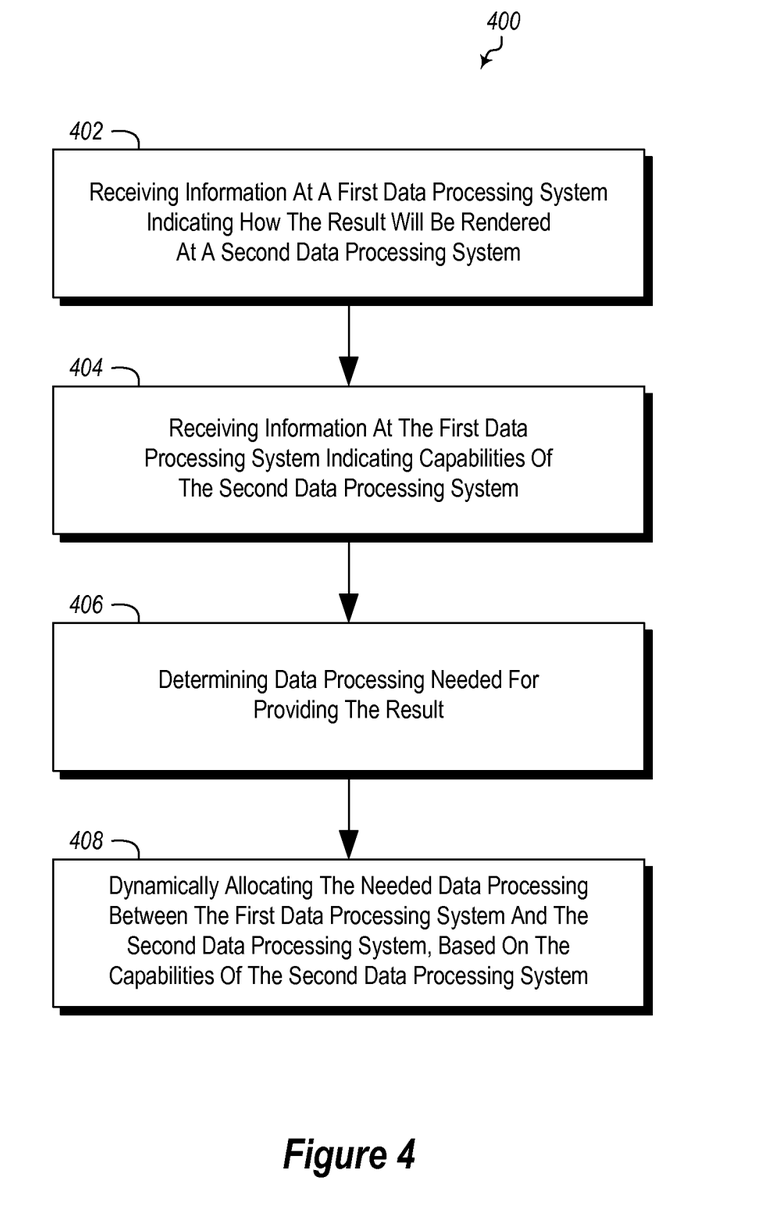
FIG. 4 illustrates a method for dividing data processing across two systems and rendering data at one of the systems.

Referring now to FIG. 4, a method 400 is illustrated. The method 400 may be practiced in a computing environment including a first data processing system and a second data processing system. The method 400 includes acts for rendering, on the second data processing system, a result derived from a set of data by performing data processing across the first data processing system and the second data processing system. The amount of processing performed by the second data processing system can be dynamically adjusted depending on the capabilities of the second data processing system.

The method 400 includes the first data processing system receiving information indicating how the result will be rendered at the second data processing system (act 402). For example, a client device may have various constraints, such as resolution, network restrictions, etc., that limit the resolution of data rendered at the client device. The client device may indicate this service level to a server. Alternatively the server may be able to determine the resolution level by network testing such as client pings or other analysis. The processing performed by both the first data processing system and the second data processing system will be performed to achieve this level of service.

The method 400 further includes the first data processing system receiving information indicating capabilities of the second data processing system (act 404). Various examples will be illustrated below, but generally, such capabilities may be hardware capabilities, such as available processing power, memory, or storage; software capabilities, such as availability of rich development platforms, developer tools, and runtime environments; network capabilities; degree that the first data processing system is connected to the second data processing system; network communication capabilities; etc.

The method 400 further includes the first data processing system determining data processing needed for providing the result (act 406).

The method 400 further includes the first data processing system dynamically allocating the needed data processing between the first data processing system and the second data processing system, based on the capabilities of the second data processing system (act 408). The needed data processing consists of a first portion to be performed by the first data system and a second portion to be performed by the second data processing system.

The method 400 may be practiced where the first data processing system is a server and the second data processing system is a client. For example, as illustrated in FIG. 1, the first data processing system 102 may be a server system, and the second data processing system 104 may be a client.

The method 400 may be practiced where receiving information indicating capabilities of the second data processing system comprises receiving information indicating data processing capabilities of the second data processing system.

The method 400 may be practiced where at the initiation of a session when a client and server establish the first connection, the software capabilities in particular, are discovered at that time. In many embodiments, these do not tend to change further during the session.

The method 400 may be practiced where receiving information indicating capabilities of the second data processing system comprises receiving information indicating available processor power at the second data processing system. For example, the second system 104 may send information (as illustrated at 106) about how much available processor capacity the second system has 104. This may be dynamic and change over time as loads and demands at the second system 104 change. Thus, the second system 104 can send information over time when the second data system is tasked with different processing for an application over time. Alternatively or additionally, certain processor power may be reserved. Thus, information can be provided indicating how much processor power is reserved for processing certain data. This can affect how data processing is allocated among the two different data processing systems. The second data system 104 can send information periodically, as the result of some threshold change in processing capabilities, reservations or for other reasons.

The method 400 may be practiced where receiving information indicating capabilities of the second data processing system comprises receiving information indicating available memory at the second data processing system. Again, as illustrated in other examples, this may change over time, which can be communicated to the first data processing system, such that the first data system can allocate different data processing to the second data processing system.

The method 400 may be practiced where receiving information indicating capabilities of the second data processing system comprises receiving information indicating available hardware devices at the second data processing system. For example, such information may include information regarding sound recorders, GPS devices, Bluetooth, Wi-Fi, cellular data, camera, near field sensors, gyroscopes, tilt sensors, or other appropriate hardware. Changes in hardware or changes to what is being sensed by the hardware may change the amount of processing allocated to the second system. For example, if cellular hardware indicates weaker signals or less capable communication systems, more processing could be allocated to the second system as sending pixels to the second system could be more data communication intensive.

The method 400 may be practiced where receiving information indicating capabilities of the second data processing system comprises receiving information indicating that hardware devices have changed. For example, embodiments may indicate that a mouse or other device has been added at a USB port.

The method 400 may be practiced where receiving information indicating capabilities of the second data processing system comprises receiving information indicating device screen resolution. This resolution may be the overall resolution of the device, or may be the size, selected by a user, for a window at the device. Thus for example, if a windows displaying application data at a device is changed by a user, such a change may cause a change in the amount of data processing to be performed at the second data processing system.

The method 400 may be practiced where receiving information indicating capabilities of the second data processing system includes receiving information indicating available graphical processing power at the second data processing system. For example, this may be related to the ability of the second data processing system to process graphical commands on a graphical processing unit (GPU).

The method 400 may be practiced where receiving information indicating capabilities of the second data processing system comprises receiving information indicating user interface elements available at the second data processing system. For example, embodiments may identify touch screens, buttons, keyboards, etc.

The method 400 may be practiced where receiving information indicating capabilities of the second data processing system comprises receiving information indicating one or more programming platforms supported by the second data processing system. For example, such information may include information that a system uses C#, JavaScript, Objective C, or some other programming platform.

The method 400 may be practiced where receiving information indicating capabilities of the second data processing system comprises receiving information indicating one or more operating systems at the second data processing system.

The method 400 may be practiced where receiving information indicating capabilities of the second data processing system comprises receiving information indicating runtime environments supported by the second data processing system. For example, such information may include information that a system uses Managed Runtime, Java Virtual Machines, JavaScript engines, or some other runtime environment.

The method 400 may be practiced where receiving information indicating capabilities of the second data processing system comprises receiving information indicating browsers in use at the second data processing system The method 400 may further include determining an amount of interactivity to be implemented at the second data processing system. In such embodiments, dynamically allocating the needed data processing between the first data processing system and the second data processing system, may be based on the amount of interactivity to be implemented at the second data processing system.

The method 400 may further include determining an amount of application maintenance to be implemented at the second data processing system. Dynamically allocating the needed data processing between the first data processing system and the second data processing system, in such embodiments, may be based the amount of application maintenance or upgrades to be implemented at the second data processing system. Examples of this are illustrated above in the discussion of application cadence.

The method 400 may further include determining an amount of application collaboration between users of an application. In some such applications, dynamically allocating the needed data processing between the first data processing system and the second data processing system, is based the amount of collaboration across active users.

The method 400 may further include determining an amount of second data processing system platform interactivity to be implemented at the second data processing system. Dynamically allocating the needed data processing between the first data processing system and the second data processing system, may be based the amount of second data processing system platform interactivity to be implemented at the second data processing system. Examples of this are illustrated above in the discussion of brand vs. platform shine-through.

The method 400 may be practiced where dynamically allocating the needed data processing between the first data processing system and the second data processing system is performed on a change in capabilities of the second data processing system. For example, if available processing power changes, memory availability changes, devices available at the system change (such as by new devices being added or removed), etc., can trigger embodiments to reevaluate how much data processing is being performed by each of the first and second data processing systems, and to adjust those amounts accordingly.

The method 400 may be practiced where dynamically allocating the needed data processing between the first data processing system and the second data processing system is performed for each request from the second data processing system to the first data processing system. Thus, each time the second data processing system requests data or services from the first data processing system, a reevaluation can take place to determine if the allocation of data processing between the two systems should be changed, and if so, appropriate reallocations are performed.

The method 400 may be practiced where dynamically allocating the needed data processing between the first data processing system and the second data processing system is performed using a continuous calibration of the capabilities of the second data processing system and factors affecting the second data processing system. In these examples, embodiments may have monitoring agents that continually monitor for changes in the capabilities of the second data processing system. When such changes occur, data processing can be reallocated between the different systems.

The method 400 may further include receiving information indicating factors affecting the second data processing system and the first data processing system dynamically allocating the needed data processing between the first data processing system and the second data processing system, based on factors affecting the second data processing system. For example, the method 400 may be practiced where receiving information indicating capabilities of the second data processing system comprises receiving information defining a fault domain for the second data processing system. A fault domain identifies the components, and failures of which will bring down a system. Thus, for example, if the second data processing system sits in a vulnerable fault domain, then less data processing may be allocated to the second data processing system. Thus for example, if the second system lacks a battery back-up, or sits in a server rack with little redundancy, it may be prudent to allocate more data processing to the first data processing system to prevent data loss.

In another example, the method 400 may be practiced where receiving information indicating capabilities of the second data processing system comprises receiving information indicating network quality between the second data processing system and the first data processing system. This quality may be defined in terms of, for example, network latency or bandwidth. Thus for example, when the network quality between a first system 102 and a second system 104 is low, it may be better to perform more data processing at the second system 104, as pixel data may consume high network bandwidth. As network quality improves, more processing can be performed at the first system 102.

In yet another example, the method 400 may be practiced where receiving information indicating capabilities of the second data processing system comprises receiving information indicating a degree of integration between the second data processing system and the other entities. For example, as illustrated above, variations may be made depending on whether an implementation is more offline or more connected. In particular, when the two systems are implemented on essentially the same hardware, the implementation is said to be offline. When the two systems are connected by external networks or connections, the implementation is said to be more connected.

In yet another example, the method 400 may be practiced where receiving information indicating capabilities of the second data processing system comprises receiving information indicating that the second data processing system is being powered by battery power. Thus for example, more data processing may be allocated to the first data processing system when the second data processing system is running on battery power. In some such embodiments, receiving information indicating capabilities of the second data processing system comprises receiving information indicating an amount of battery power remaining at the second data processing system. Thus, even further refinements may be made to data processing allocation based on the amount of battery power remaining at the second data processing system. In contrast, when a processing system is powered by an infrastructure method, such as from a utility company or other power generator source, the second data processing system may be allocated more data processing than when powered by batteries.

Figure 5:
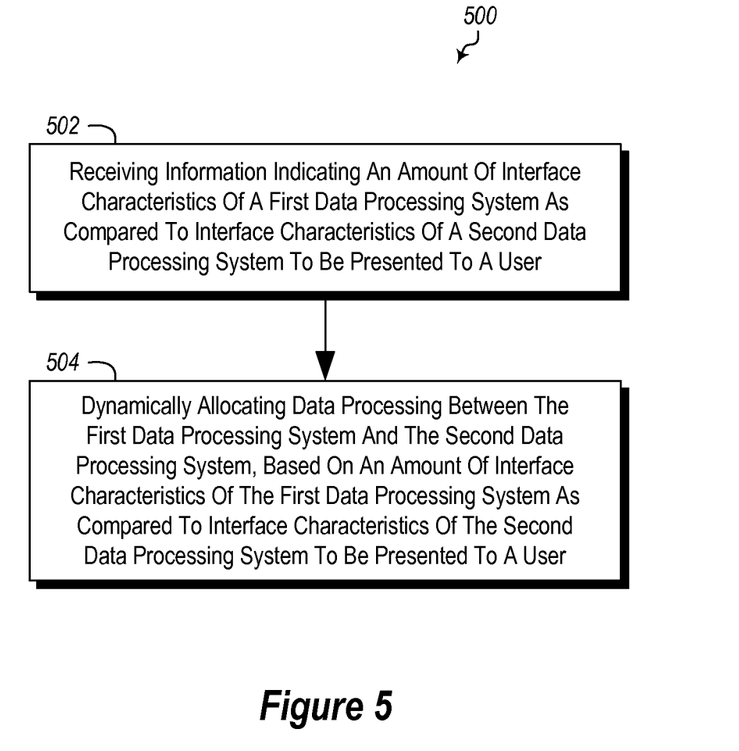

Referring now to FIG. 5, a method 500 is illustrated. The method 500 may be practiced in a computing environment including a first data processing system and a second data processing system. The method 500 includes acts for rendering, on the second data processing system, a result derived from a set of data by performing data processing across the first data processing system and the second data processing system where the amount of processing performed by the second data processing system can be dynamically adjusted depending on an amount of interface characteristics of the first data processing system as compared to interface characteristics of the second data processing system to be presented to a user. In particular, this embodiment can implement the brand shine-through versus platform shine-through illustrated above.

The method 500 includes the first data processing system receiving information indicating an amount of interface characteristics of the first data processing system as compared to interface characteristics of the second data processing system to be presented to a user (act 502). For example, a determination can be made as to what amount of standardized user interface elements will be displayed to an end user as compared to platform specific element interface elements on platforms used by the user. In a specific example, the first data processing system may be able to standardize user interface elements as Windows Phone OS interface element. However, the second data processing system may be an iOS or Android device. Thus, if the first data processing system interface dominates, more interface elements will be Windows Phone OS style elements, whereas is the second data processing system interface dominates, then more iOS or Android interface elements will be displayed.

The method 500 further includes the first data processing system dynamically allocating data processing between the first data processing system and the second data processing system, based on an amount of interface characteristics of the first data processing system as compared to interface characteristics of the second data processing system to be presented to a user (act 504). The data processing consists of a first portion to be performed by the first data system and a second portion to be performed by the second data processing system.

The method 500 may be practiced where the first data processing system is a server and the second data processing system is a client.

The method 500 may be practiced where information indicating an amount of interface characteristics of the first data processing system as compared to interface characteristics of the second data processing system to be presented to a user is based on user settings at the second data processing system. For example, a user may specifically indicate the type of interface elements that they prefer. This may be done by specifically identifying interface elements and which style should dominate. Alternatively, the user could adjust a slider or other variable indicator indicating a degree that the user prefers one type of interface over another. The system could then balance interface elements according to a user's preference.

The method 500 may be practiced where information indicating an amount of interface characteristics of the first data processing system as compared to interface characteristics of the second data processing system to be presented to a user is based on the characteristics of the second data processing system. For example, if the second data processing system is running a particular operating system, native device platform, or native framework, a determination may be made regarding interface elements that will dominate the user interface experience. Such decisions may be made based on the ability of the operating system, native device platform, or native framework to implement certain interface elements effectively, or perceived loyalty of certain users to certain operating systems, native device platforms, or native framework, or for other reasons.

The method of 500 may be practiced where dynamically allocating data processing between the first data processing system and the second data processing system, based on an amount of interface characteristics of the first data processing system as compared to interface characteristics of the second data processing system to be presented to a user comprises sending general interface element instructions when more data processing is to be allocated to the second data processing system. For example, an instruction can simply be passed to the second data processing system indicating that a "true/false" selection interface element is to be displayed. The second data processing system could then use whatever native abilities it had to implement this interface element, whether via a checkbox, a slider, or some other element.

In contrast, the method 500 may be practiced where dynamically allocating data processing between the first data processing system and the second data processing system, based on an amount of interface characteristics of the first data processing system as compared to interface characteristics of the second data processing system to be presented to a user comprises sending specific interface element instructions when more data processing is to be allocated to the second data processing system. For example, the first data processing system, instead of simply indicating that a true/false element should be displayed, may indicate that a slider should be implemented and that a label on the right hand of the slider should be labeled "True" and that a label on the left hand of the slider should be labeled "False". Thus, the first system will have more control over the feel of the interface than the second system will have.

The method 500 may further include determining an amount of interactivity to be implemented at the second data processing system. In some such embodiments, dynamically allocating the needed data processing between the first data processing system and the second data processing system, is also based the amount of interactivity to be implemented at the second data processing system.

The method 500 may further include determining an amount of application maintenance to be implemented at the second data processing system. In some such embodiments, dynamically allocating the needed data processing between the first data processing system and the second data processing system, is based the amount of application maintenance or upgrades to be implemented at the second data processing system. Examples of this are illustrated above in the discussion of application cadence.

The method 500 may further include determining an amount of application collaboration between users of an application. In some such embodiments, dynamically allocating the needed data processing between the first data processing system and the second data processing system, is based the amount of collaboration across users.

The method 500 may be practiced where dynamically allocating the needed data processing between the first data processing system and the second data processing system is performed each time a session is initialized between the first data processing system and the second data processing system.

The method 500 may be practiced where dynamically allocating the needed data processing between the first data processing system and the second data processing system is performed on a change in the information indicating an amount of interface characteristics of the first data processing system as compared to interface characteristics of the second data processing system to be presented to a user.

The method 500 may be practiced where dynamically allocating the needed data processing between the first data processing system and the second data processing system is performed for each request from the second data processing system to the first data processing system.

The method 500 may be practiced where dynamically allocating the needed data processing between the first data processing system and the second data processing system is performed using a continuous calibration using the information indicating an amount of interface characteristics of the first data processing system as compared to interface characteristics of the second data processing system to be presented to a user.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, cloud computing systems, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of rendering, on a second data processing system, a result derived from a set of data by performing data processing across a first data processing system and the second data processing system, where the amount of processing performed by the second data processing system is dynamically adjusted depending on a machine learning model, the method comprising:
   the first data processing system receiving information defining how a result associated with a data processing task will be rendered at the second data processing system;
   the first data processing system identifying a machine learning model that models user behavior at the second data processing system in connection with operation of the data processing task; and
   the first data processing system dynamically allocating a first portion of needed data processing for the data processing task to the first data processing system and allocating a second portion of the needed data processing to the second data processing system, based on an amount of modeled user behavior at the second data processing system in connection with operation of the data processing task that is modeled by the machine learning model, including:

based at least on the amount of modeled user behavior being below a defined threshold, allocating the first portion of the needed data processing to the first data processing system as a larger portion of the needed data processing than the second portion of the needed data processing that is allocated to the second data processing system; or     based at least on the amount of modeled user behavior being above the defined threshold, allocating the first portion of the needed data processing to the first data processing system as a smaller portion of the needed data processing than the second portion of the needed data processing that is allocated to the second data processing system, wherein the first data processing system maintains the machine learning model when the amount of modeled user behavior is below the defined threshold, and wherein the first data processing system installs the machine learning model at the second data processing system when the amount of modeled user behavior reaches the defined threshold.

2. The method of claim 1, wherein the first data processing system is a server and the second data processing system is a client.

3. The method of claim 1, further comprising receiving information defining a fault domain for the second data processing system.

4. The method of claim 1, further comprising receiving information indicating network quality between the second data processing system and the first data processing system.

5. The method of claim 1, wherein further comprising receiving information indicating a degree of integration between the second data processing system and other entities.

6. The method of claim 1, wherein dynamically allocating the first and second portions of the needed data processing between the first data processing system and the second data processing system is performed using a continuous calibration of one or more factors affecting the second data processing system.

7. The method of claim 1, wherein dynamically allocating the first and second portions of the needed data processing between the first data processing system and the second data processing system is performed each time a session is initialized between the first data processing system and the second data processing system.

8. The method of claim 1, wherein dynamically allocating the first and second portions of the needed data processing between the first data processing system and the second data processing system is performed on a change in one or more factors affecting the second data processing system.

9. The method of claim 1, wherein dynamically allocating the first and second portions of the needed data processing between the first data processing system and the second data processing system is performed for each request from the second data processing system to the first data processing system.

10. A system for rendering, on a second data processing system, a result derived from a set of data by performing data processing across a first data processing system and the second data processing system, where the amount of processing performed by the second data processing system is dynamically adjusted depending on a machine learning model, the system comprising:

one or more processors;

a network communications device; and one or more computer readable media, wherein the one or more computer readable media comprise computer executable instructions that are executable by at least one of the one or more processors to configure the system to perform at least the following:

receive, over the network communications device, information defining how a result associated with a data processing task will be rendered at the second data processing system;

identify a machine learning factor comprising a machine learning model that models user behavior at the second data processing system in connection with operation of the data processing task; and         dynamically allocate a first portion of needed data processing for the data processing task to the first data processing system and allocating a second portion of the needed data processing to the second data processing system, based on an amount of modeled user behavior at the second data processing system in connection with operation of the data processing task that is modeled by the machine learning model, including:

based at least on the amount of modeled user behavior being below a defined threshold, allocating the first portion of the needed data processing to the first data processing system as a larger portion of the needed data processing than the second portion of the needed data processing that is allocated to the second data processing system; or             based at least on the amount of modeled user behavior being above the defined threshold, allocating the first portion of the needed data processing to the first data processing system as a smaller portion of the needed data processing than the second portion of the needed data processing that is allocated to the second data processing system,         wherein the first data processing system maintains the machine learning model when the amount of modeled user behavior is below the defined threshold, and wherein the first data processing system installs the machine learning model at the second data processing system when the amount of modeled user behavior reaches the defined threshold.

11. The system of claim 10, wherein the allocation is also based on a fault domain for the second data processing system.

12. The system of claim 10, wherein the allocation is also based on network quality between the second data processing system and the first data processing system.

13. The system of claim 10, wherein the allocation is also based on a degree of integration between the second data processing system and other entities.

14. The system of claim 10, wherein dynamically allocating the first and second portions of the needed data processing between the first data processing system and the second data processing system is performed using a continuous calibration of one or more factors affecting the second data processing system.

15. The system of claim 10, wherein dynamically allocating the first and second portions of the needed data processing between the first data processing system and the second data processing system is performed each time a session is initialized between the first data processing system and the second data processing system.

16. The system of claim 10, wherein dynamically allocating first and second portions of the needed data processing between the first data processing system and the second data processing system is performed on a change in one or more factors affecting the second data processing system.

17. The system of claim 10, wherein dynamically allocating the first and second portions of the needed data processing between the first data processing system and the second data processing system is performed for each request from the second data processing system to the first data processing system.

18. A physical computer readable storage device comprising computer executable instructions that are executable by at least one processor of a first data processing system to configure the first data processing system to perform at least the following:
receive information defining how a result associated with a data processing task will be rendered at the second data processing system;
identify a machine learning factor comprising a machine learning model that models user behavior at the second data processing system in connection with operation of the data processing task; and
dynamically allocate a first portion of needed data processing for the data processing task to the first data processing system and allocating a second portion of the needed data processing to the second data processing system, based on an amount of modeled user behavior at the second data processing system in connection with operation of the data processing task that is modeled by the machine learning model, including:
based at least on the amount of modeled user behavior being below a defined threshold, allocating the first portion of the needed data processing to the first data processing system as a larger portion of the needed data processing than the second portion of the needed data processing that is allocated to the second data processing system; or
based at least on the amount of modeled user behavior being above the defined threshold, allocating the first portion of the needed data processing to the first data processing system as a smaller portion of the needed data processing than the second portion of the needed data processing that is allocated to the second data processing system,
wherein the first data processing system maintains the machine learning model when the amount of modeled user behavior is below the defined threshold, and wherein the first data processing system installs the machine learning model at the second data processing system when the amount of modeled user behavior reaches the defined threshold.

19. The physical computer readable storage device of claim 18, wherein the allocation is also based on a fault domain for the second data processing system.

20. The physical computer readable storage device of claim 18, wherein the allocation is also based on network quality between the second data processing system and the first data processing system.

21. The physical computer readable storage device of claim 18, wherein the allocation is also based on a degree of integration between the second data processing system and other entities.

22. The physical computer readable storage device of claim 18, wherein dynamically allocating the first and second portions of the needed data processing between the first data processing system and the second data processing system is performed using a continuous calibration of one or more factors affecting the second data processing system.

23. The physical computer readable storage device of claim 18, wherein dynamically allocating the first and second portions of the needed data processing between the first data processing system and the second data processing system is performed each time a session is initialized between the first data processing system and the second data processing system.

24. The physical computer readable storage device of claim 18, wherein dynamically allocating the first and second portions of the needed data processing between the first data processing system and the second data processing system is performed on a change in one or more factors affecting the second data processing system.

25. The physical computer readable storage device of claim 18, wherein dynamically allocating the first and second portions of the needed data processing between the first data processing system and the second data processing system is performed for each request from the second data processing system to the first data processing system.

* * * * *